United States Patent
Whiter

(10) Patent No.: US 6,773,754 B2
(45) Date of Patent: Aug. 10, 2004

(54) ACCELERATED CURING OF EPOXY GELCOATS

(75) Inventor: Mark Whiter, Saffron Walden (GB)

(73) Assignee: Hexcel Composites, Ltd. (GB)

( * ) Notice: Subject to any disclaimer, the term of this patent is extended or adjusted under 35 U.S.C. 154(b) by 84 days.

(21) Appl. No.: 10/316,608

(22) Filed: Dec. 10, 2002

(65) Prior Publication Data

US 2003/0130481 A1 Jul. 10, 2003

(30) Foreign Application Priority Data

Dec. 12, 2001 (GB) .............................. 0129675

(51) Int. Cl.$^7$ ................................. B05B 3/02
(52) U.S. Cl. .................... 427/372.2; 523/404; 523/417; 523/420; 523/457; 528/93; 528/95; 528/413
(58) Field of Search ................. 427/372.2; 523/404, 523/417, 420, 457; 528/93, 95, 413

(56) References Cited

U.S. PATENT DOCUMENTS

| | | |
|---|---|---|
| 3,492,269 A | 1/1970 | Janssen et al. |
| 5,198,146 A | 3/1993 | Shomer |
| 5,243,014 A | 9/1993 | Shomer |
| 5,266,611 A | 11/1993 | Teschendorf |
| 5,962,629 A | 10/1999 | Corley et al. |
| 6,013,757 A | 1/2000 | Corley et al. |
| 6,127,508 A | 10/2000 | Corley et al. |

FOREIGN PATENT DOCUMENTS

| | | |
|---|---|---|
| EP | 0 697 426 A1 | 2/1996 |
| GB | 1 428 625 | 9/1976 |

OTHER PUBLICATIONS

Ellis, T.S. amd F.E. Karasz, "Interaction of epoxy resins with water: the depression of glass transition temperature," Polymer, 1984, vol. 25, May, pp. 664 669.

Johncock, P., "Effect of Absorbed Water on Undercured Epoxy/Amine Thermosets," Journal of Applied Polymer Science, vol. 41, 613–618 (1990), pp. 613–618.

Brady, Jr., R. F. and J. M. Charlesworth, "Influence of Imidazoline Content and Water On the Reaction between Amidoamine and Epoxy Resin," Journal of Coatings Technology, vol. 65, No. 816, Jan. 1993, pp. 81–88.

Primary Examiner—Philip Tucker
Assistant Examiner—D. Aylward
(74) Attorney, Agent, or Firm—Shapiro & Dupont LLP

(57) ABSTRACT

Aqueous solutions of inorganic nitrate salts are used to accelerate the gelling of epoxy gelcoat resins without adversely affecting the glass transition temperature of the finally cured gelcoat. The aqueous accelerants may be used to accelerate gelling of gelcoats that are formed during initial fabrication of composite parts. The aqueous acclerants are also useful for shortening the gel time of gelcoats that are intended for use in repairing damaged structures.

24 Claims, No Drawings

ACCELERATED CURING OF EPOXY GELCOATS

BACKGROUND OF THE INVENTION

1. Field of the Invention

The present invention relates generally to epoxy gels that are used to form the exterior coating of a wide variety of products made from composite materials. More particularly, the invention involves epoxy resins that form gels at room temperature and may be used in the fabrication of gelcoats on new parts or as a repair for damaged gelcoats.

2. Description of Related Art

Epoxy resins that are used to form gelcoats are, like other epoxy resins, typically cured by a reaction between a monomer containing an epoxide end-group and a "hardener", i.e., a multifunctional nucleophile, such as an amine or a hydroxyl-containing moiety. For many epoxy resins, the curing process is usually carried out at an elevated temperature dictated by the nature of the prepolymeric species involved. For gelcoats, however, it is also important that the epoxy resin be able to form a gel relatively rapidly at room temperature.

Gelcoat resins are typically applied to the surface of a mold that is being used to form a composite part. During application, the gelcoat resin must remain sufficiently fluid so that is can be brushed on or otherwise applied to the mold to form a uniform layer of resin. The gelcoat is then allowed to cure at room temperature to form a gelled layed. Once the gelcoat has gelled, layers of composite material (e.g., fiberglass and epoxy resin) are applied to form the main structure of the part. It is essential that the gelcoat be completely gelled prior to application of the remaining composite material. If gelling is not complete, the gelcoat could be damaged and the exterior surface of the resulting part disrupted.

Gelcoats are usually prepared by mixing the gelcoat resin with a hardener to form an activated gelcoat resin. The time that it takes for the activated gelcoat resin to go from a viscous liquid to a gelled body at room temperature is known as the "gel time". In general, it is desirable to shorten the gel time as much as possible so that the overall fabrication time will also be reduced. Shortened gel times are also important when the gelcoat resin is being applied as a repair to the surface of a damaged part. However, it is equally important that any attempt to accelerate gel formation and shorten gel times does not adversely affect other properties of the gelcoat. For example, the glass transition temperature (Tg) of the finally cured gelcoat is an important property that may be reduced substantially when gel times are shortened.

One approach to shortening gel times involves adding various combinations of chemicals to the resin to accelerate the gelling process. One such combination of chemicals is the accelerator system that is disclosed in U.S. Pat. No. 5,243,014. This system is based on aqueous or non-aqueous mixtures of an inorganic salt with an aliphatic hydroxy compound and an aminophenol. Due to the complex chemistries involved in the gelling of epoxy resins, it is difficult to predict what, if any, correlation there is between the various chemicals that are added to the gelcoat and the gel time or resulting properties of the cured gelcoat.

In view of the above uncertainties, there is a continuing need to select and develop new combinations of chemicals that are capable of shortening the gel times of resins used in gel coatings without adversely affecting other properties of the cured gelcoat, such as the glass transition temperature.

SUMMARY OF THE INVENTION

The present invention provides gelcoat systems having a greatly reduced room temperature gel time, when compared to a non-accelerated gelcoat system, without adversely affecting the Tg of the cured gelcoat. It was discovered that aqueous solutions of inorganic nitrate salts could be used as an accelerator to substantially decrease room temperature gelling times without substantially reducing the Tg of the finally cured gelcoat.

Based on the discoveries of the present invention, a kit is provided for use in forming an epoxy gelcoat. The kit is composed of: a hardener component that includes a curing agent; and a resin component that includes a liquid epoxy resin. The two components are mixed together to form an activated gelcoat resin that is converted from a liquid to a gel over a period of time at room temperature. As a feature of the present invention, an aqueous accelerator is included as part of the kit. The aqueous accelerator contains an aqueous solution of an inorganic nitrate salt.

It was found that the use of an aqueous solution of an inorganic nitrate salt as an accelerator caused a significant reduction in the room temperature gel time observed, from about 6 hours to about 1 hour. A further, advantage of the aqueous nitrate accelerator is that the Tg of the cured gelcoat remains substantially unchanged relative to the Tg of similar non-accelerated gelcoats.

The present invention also covers methods for making gelcoats where the gel times are substantially reduced by use of an aqueous nitrate accelerator. The methods include curing of the gelled coating to form the finally cured gelcoat. The invention is applicable to methods for forming gelcoats during the initial fabrication of a part as well as methods for repairing existing gelcoats. The invention is especially useful in situations where short gel times are desired, such as in mass production of composite parts or field repair of damaged structures.

The above discussed and many other features and attendant advantages of the present invention will become better understood by reference to the following detailed description.

DETAILED DESCRIPTION OF THE INVENTION

The present invention is useful for shortening the room temperature gel time of a variety of epoxy resins that are typically used in making gelcoats. Exemplary gel coat resins that may be accelerated include aliphatic difunctional or trifunctional epoxy polymers. Preferred resins that may be used to form the gelcoat include Araldite DY-T/CH which is available from Vantico (Duxford, United Kingdom). Heloxy 48 which is available from Resolution Polymers, Inc. and CVC Erisys GE-30 or GE-31.

Conventional additives may also be added to the epoxy resin as is well known by those skilled in gelcoat technology. Such additives include thixotropic agents, ultraviolet light (UV) absorbers and pigments. Exemplary thixotropic agents include, fumed metal oxides, glass beads, and microballons. Fumed silica oxides such as CABOSIL (Cabot Corp., Boston, Mass.) are preferred thixotropic agents. An exemplary pigment is titanium oxide. Other pigments that are normally used in gelcoats may also be used.

Suitable UV absorbers may include benzophenones and hindered amine light stabilizers, if desired. As is known, the above resins are inherently resistant to UV light so that the use of a UV absorber additive is optional.

The gel coat resin must be mixed with a hardener in order for room temperature gelling to occur. The hardener should include a curing agent. Amine curing agents are suitable with diamine curing agents being preferred. Triamine curing agents may be used if desired. Exemplary diamine curing agents include aliphatic diamine and cycloalphatic amines such as isophorone diamine and TCD-diamine. Hardeners that include aminophenol are not preferred because they may adversely affect the UV absorbing and mechanical properties of the gel coat The gel coat resin is activated by combining it with the hardener. The gel times for the activated resin and the final properties of the gel coat will vary depending upon the particular combination of resin, additives and hardener as well as the relative amounts of each ingredient. The activated liquid gelcoat should be sufficiently fluid so that it may be applied to the mold or part surface to form a uniform layer. The activated resin should preferably have a viscosity in the range of 100 to 1000 poise at a shear rate of one per second. In addition, the final properties of the cured gel coat, such as Tg, will also vary depending upon the above parameters as well as the cure conditions. Typical gel times for non-accelerated gelcoats are on the order of 6 hours. The Tg of these gel coats, when cured, can range from around 90° C. for gelcoats cured at above 80° C. down to 60 to 70° C. Tg for gel coats cured at temperatures on the order of 55° C.

In accordance with the present invention, an aqueous accelerator is included in the activated resin in an amount that substantially reduces the gel time without substantially reducing the Tg of the cured gelcoat. A substantial reduction in gel time is considered to be at least a 50 percent decrease in the time it takes the activated liquid gel coat resin to convert from a liquid to a gel. Preferably, the reduction in gel time will be even greater. For example, decreases in gel time from around 6 hours to about 1 hour are preferred. A substantial reduction in Tg is considered to be no more than about a 25 percent decrease. However, it is preferred that the decrease in Tg due to the acceleration of gel formation be no more than about 10 percent.

The aqueous accelerator is an aqueous solution of an inorganic nitrate salt. Suitable inorganic nitrate salts include nitrates of ammonium, lithium, sodium, potassium, magnesium, calcium, strontium, barium and aluminium. Calcium nitrate is the preferred salt. Both the dihydrate and tetrahydrate forms of calcium nitrate may be used since the salt is dissolved in water. It is preferred that the weight ratio of the nitrate salt to water be about 2 to 1. This ratio may be varied provided that there is a sufficient amount of water to completely dissolve the nitrate salt to form an aqueous solution.

The aqueous accelerator should be free of aliphatic hydroxy compounds, such as monohydric alcohols. Preferably, the amount of aliphatic hydroxy compounds present in the aqueous accelerator will be less than 1 percent. Most preferred is that essentially no aliphatic hydroxy compounds are present in the aqueous accelerator.

The aqueous accelerator may be stored in the epoxy resin component and/or the hardener component prior to the two components being mixed together. It is preferred that the aqueous accelerator be combined with the hardener component and stored therein. Incorporating the aqueous accelerator into one of the two gelcoat components and storing it there is preferred since it simplifies activation of the gelcoat. However, if desired, the mixing of the aqueous accelerator with the resin and hardener components can be delayed until the gelcoat is activated. The gelcoat systems are preferably provided as a two-part kit that contains a resin component and a hardener component that contains the accelerator.

The resin component preferably will include the following ingredients when the accelerator is mixed therein:

55 to 75 weight percent epoxy resin;

20 to 40 weight percent pigment 0.5 to 3 weight percent pigment 2 to 4 weight calcium nitrate; and 1 to 2 weight percent water.

The hardener component will preferably include from 80 to 99 weight percent of a diamine curing agent, such as isophorone diamine or 4,7-methano-1H-indenedimethanamine, octahydro (TCD-diamine) and from 1 to 20 weight percent of a thickening agent. Fumed silica is preferred.

The resin component is mixed with the hardener component to form the activated gelcoat resin. The mixing ratios are preferably from 90 to 110 parts by weight resin component mixed with from 20 to 40 parts by weight hardener component.

Once the activated gelcoat resin is formed, it is left at room temperature until the liquid resin is converted to a gel. Room temperature is considered to be between about 15° C. and 25° C. When the gelcoat is being used in the fabrication of a new composite material part, the gelcoat is not cured further until the remainder of the composite material has been added. After the part is finished, the gelcoat is cured at an elevated temperature until curing of the gel is complete. Typical cure temperatures are from 80 to 120° C. with cure times being on the order of 1 hour at the higher temperatures and 4 hours for the lower cure temperatures. Isophorone diamine is the preferred curing agent for this type of gelcoat system. The Tg of this type of gelcoat is on the order of 90 to 100° C.

When the gelcoat resin is being used to repair existing structures, the curing temperature is typically lowered to around 55° C. with the cure times also being on the order of 1 hour or more. As a result of the lower curing temperatures, the Tg of the cured repair gelcoat is also lower. Typical Tg's for repair gelcoats are around 60 to 70° C.

The cured gelcoat resulting from the gelcoat system of the present invention may find utility as a coating for composite structures; i.e., structures based on reinforcement fibers and polymeric matrices which may optionally contain a core material such as honeycomb or balsa. In particular the gelcoat system may be used for coating large composite components such as boat hulls, airplane parts and wind blades, which are usually made from fiberglass or carbon fiber composites (prepreg or otherwise). The thickness of such gelcoats will vary depending upon the particular application. When the gelcoat system of the present invention is used as a repair coat to repair existing coated substrates, the gelcoat is preferably applied to the substrate as a film having a thickness in the order of 0.1–1 mm.

Examples of practice are as follows:

EXAMPLE 1

Gelcoats For Use In Initial Fabrication Of Parts

The following exemplary gelcoat system is designed for use in the manufacture of composite parts where the gelcoat is applied as a layer on the mold surface prior to laying up of the laminates that make up the main structure of the part.

An aqueous accelerator consisting of an aqueous solution of calcium nitrate tetrahydrate was prepared by dissolving 2 parts (by weight) of calcium nitrate tetrahydrate in 1 part water. 4.5 parts of this accelerator solution was then added to 100 parts of an epoxy resin that included fumed silica as a thixotropic agent and titanium oxide as a pigment.

The resulting resin component had the following composition by weight:

| | |
|---|---|
| Araldite DY-T/CH epoxy resin | 66.0 percent |
| Titanium Dioxide (R-D grade) | 28.3 percent |
| Cabosil TS720 | 1.4 percent |
| Calcium nitrate tetrahydrate | 2.9 percent |
| Water | 1.4 percent |

Araldite DY-T/CH (Vantico). Cabosil TS720 is a fumed silica that is available from Cabot Corp. (Boston, Mass.).

Isophorone diamine was mixed with fumed silica (CABOSIL M5) to provide a hardener component that contained 91.3 weight percent isophorone diamine and 8.7 weight percent fumed silica. 100 parts by weight of the resin component was mixed with 28 parts by weight of the hardener component and the resulting liquid activated gelcoat resin was allowed to gel at room temperature. Gel time was 1 hour as compared to a 6-hour gel time for the same gelcoat mixture without the aqueous accelerator. If desired, the 4.5 parts of aqueous accelerator could be mixed with the hardener first. The resulting hardener/accelerator combination is then mixed with the resin component.

A first sample layer of the gelled gelcoat was cured at 120° C. for 1 hour. The resulting cured gelcoat had a Tg of 83° C. A second sample layer of gelled gelcoat was cured at 80° C. for 4 hours. The second cured sample also had a Tg of 83. The Tg of similarly cured gelcoat mixtures without the aqueous accelerator had Tg's of 92.

In comparative tests, calcium nitrate accelerator solutions were prepared that used methanol as the solvent instead of water. The resulting cured gelcoats had Tg's of between 40 and 50.

EXAMPLE 2

Gelcoat For Use In Repairing Damaged Structures

In a second embodiment of the gelcoat system of the present invention, the hardener was modified in order to furnish a system which is suitable as a repair coat. The hardener was prepared by substituting TCD-diamine for isophorone diamine. The modified hardener was composed of 94.1 weight percent TCD-diamine and 5.9 weight percent fumed silica (CABOSIL M5).

TCD-diamine, as supplied by Celanese Chemicals Europe GmbH, has the chemical name 3(4),8(9)-Bis-(aminomethyl)-tricyclo[$5.2.1.0^{2,6}$]decane Octahydro-4,7-methanoinden-1(2),5(6)-dimethanamine.

The resin component used in this second example was the same as the resin component used in Example 1. 100 parts of the aforesaid epoxy resin component was mixed with 28 or 32 parts of hardener that had been modified for repair coating. The activated liquid gelcoat resin was formed into a thin film and allowed to gel at room temperature. The gel time was one hour. The gelled gelcoat was then cured for 1 hour at 55° C. The resulting cured gelcoat was found to have a Tg of 66° C. The Tg of similar gelcoats that do not have the aqueous accelerator is around 70° C.

It is of course to be understood that the invention is not intended to be restricted to the details of the above embodiments which are described by way of example only.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A kit for use in forming an epoxy gelcoat, said kit comprising:
   A) a hardener component comprising an epoxy curing agent;
   B) a resin component comprising a liquid epoxy resin that is mixable with said hardener component to form a liquid activated gelcoat resin that is converted from a liquid to a gel over a period of time at room temperature; and
   C) an aqueous accelerator component consisting of an aqueous solution of an inorganic nitrate salt, wherein said accelerator is present in a sufficient amount when mixed with said resin and hardener to reduce the period of time required to convert said liquid activated gelcoat resin to said gel.

2. A kit according to claim 1 wherein said aqueous accelerator component is combined with said resin component to provide a two-part kit.

3. A kit according to claim 1 wherein said aqueous accelerator component is combined with said hardener component to provide a two-part kit.

4. A kit according to claim 1 wherein said resin component further comprises a thixotropic agent and/or a pigment.

5. A kit according to claim 1 wherein said inorganic nitrate salt is calcium nitrate.

6. A gelled epoxy coating that is made by combining the hardener, resin and aqueous accelerator components according to claim 1 to form said activated liquid gelcoat resins and allowing said activated liquid gelcoat resin to remain at room temperature for a sufficient time to convert said epoxy resin from said liquid to said gel.

7. A gelled epoxy coating according to claim 6 wherein said gelled epoxy coating further includes a thixotropic agent and/or a pigment.

8. A gelled epoxy coating according to claim 6 wherein said inorganic nitrate salt is calcium nitrate.

9. A cured epoxy gel coating comprising a gelled epoxy coating according to claim 6 that has been cured at a temperature above room temperature for a sufficient time to form a cured epoxy gel coating from said gelled epoxy coating.

10. A cured epoxy gel coating according to claim 9 wherein said cured epoxy gel coating further includes a thixotropic agent and/or a pigment.

11. A cured epoxy gel coating according to claim 9 wherein said inorganic nitrate salt is calcium nitrate.

12. A method for making a gelled epoxy coating comprising the steps of:
   providing a kit according to claim 1; and
   combining a sufficient amount of said hardener component with a sufficient amount of said resin component and a sufficient amount of said aqueous accelerator component to form said activated liquid gelcoat resin and allowing said activated liquid gelcoat resin to remain at room temperature for a sufficient time to form said gelled epoxy coating.

13. A method for making a gelled epoxy coating comprising the steps of:

providing a kit according to claim 2; and combining a sufficient amount of said hardener with said combined resin component and aqueous accelerator component to form said activated liquid gelcoat resin and allowing said activated liquid gelcoat resin to remain at room temperature for a sufficient time to form said gelled epoxy coating.

14. A method for making a gelled epoxy coating comprising the steps of:

providing a kit according to claim 3; and combining a sufficient amount of said resin component with said combined hardener component and aqueous accelerator component to form said activated liquid gelcoat resin and allowing said activated liquid gelcoat resin to remain at room temperature for a sufficient time to form said gelled epoxy coating.

15. A method for making a gelled epoxy coating according to claim 13 wherein said resin component includes a thixotropic agent and/or pigment.

16. A method for making a gelled epoxy coating according to claim 13 wherein said inorganic nitrate salt is calcium nitrate.

17. A method for making a gelled epoxy coating according to claim 14 wherein said resin component includes a thixotropic agent and/or pigment.

18. A method for making a gelled epoxy coating according to claim 14 wherein said inorganic nitrate salt is calcium nitrate.

19. A method for making a cured epoxy gelcoat comprising the step of curing a gelled epoxy coating according to claim 6 at a temperature above room temperature for a sufficient time to form said cured epoxy gelcoat.

20. A method for making a cured epoxy gelcoat according to claim 19 in which said resin component further includes a thixotropic agent and/or a pigment.

21. A method for making a cured epoxy gelcoat according to claim 19 wherein said inorganic nitrate salt is calcium nitrate.

22. In a method for forming a cured epoxy gelcoat wherein a hardener is mixed with a liquid epoxy gelcoat resin to form an activated gelcoat resin that is converted from a liquid to a gel over a period of time at room temperature and wherein said gel is further cured at a temperature above room temperature to form a cured epoxy gel coat having a glass transition temperature, the improvement comprising adding an aqueous accelerator to said liquid epoxy gelcoat resin, said aqueous accelerator consisting of an aqueous solution of an inorganic nitrate salt, wherein said aqueous accelerator is added in an amount sufficient to substantially reduce the period of time required to convert said liquid activated gelcoat resin to said gel while not substantially reducing the glass transition temperature of said cured epoxy gelcoat.

23. An improved method for forming an epoxy gelcoat according to claim 22 wherein said liquid epoxy gelcoat resin includes a thixotropic agent and/or a pigment.

24. An improved method for forming an epoxy gelcoat according to claim 22 wherein said inorganic nitrate salt is calcium nitrate.

* * * * *